(12) United States Patent
Kim et al.

(10) Patent No.: US 7,327,429 B2
(45) Date of Patent: Feb. 5, 2008

(54) IN-PLANE SWITCHING LIQUID CRYSTAL DISPLAY DEVICE

(75) Inventors: Do-Sung Kim, Gumi-si (KR); Byung-Koo Kang, Gumi-si (KR)

(73) Assignee: LG.Philips LCD Co., Ltd., Seoul (KR)

( * ) Notice: Subject to any disclaimer, the term of this patent is extended or adjusted under 35 U.S.C. 154(b) by 210 days.

(21) Appl. No.: 10/961,086

(22) Filed: Oct. 12, 2004

(65) Prior Publication Data

US 2005/0078258 A1  Apr. 14, 2005

(30) Foreign Application Priority Data

Oct. 13, 2003   (KR)   ................ 10-2003-0071060

(51) Int. Cl.
  *G02F 1/1343*  (2006.01)
(52) U.S. Cl. .................................... 349/141
(58) Field of Classification Search ............... 349/141
  See application file for complete search history.

(56) References Cited

U.S. PATENT DOCUMENTS

| | | | |
|---|---|---|---|
| 6,088,078 A | 7/2000 | Kim et al. | |
| 6,452,657 B1 | 9/2002 | Suzuki et al. | |
| 6,552,770 B2 * | 4/2003 | Yanagawa et al. | 349/155 |
| 6,600,542 B2 * | 7/2003 | Kim et al. | 349/141 |
| 6,642,984 B1 * | 11/2003 | Yoshida et al. | 349/139 |

\* cited by examiner

*Primary Examiner*—James A. Dudek
(74) *Attorney, Agent, or Firm*—McKenna Long & Aldridge LLP

(57) ABSTRACT

A substrate for an in-plane switching liquid crystal display device includes a gate line along a first direction, a data line along a second direction, the data line crossing the gate line to define a pixel region, a thin film transistor at a crossing of the gate and data lines, pixel electrodes along a third direction within the pixel region, the pixel electrodes connected to the thin film transistor, common electrodes along the third direction, the common electrodes being in an alternating pattern with the pixel electrodes, and an alignment layer covering the common electrodes and the pixel electrodes, the alignment layer having an alignment direction along the first direction.

19 Claims, 9 Drawing Sheets

IN-PLANE SWITCHING LIQUID CRYSTAL DISPLAY DEVICE

This application claims the benefit of Korean Patent Application No. 2003-0071060, filed on Oct. 13, 2003, which is hereby incorporated by reference as if fully set forth herein.

BACKGROUND OF THE INVENTION

1. Field of the Invention

The present invention relates to a liquid crystal display (LCD) device. More particularly, the present invention relates to an in-plane switching liquid crystal display (IPS-LCD) device.

2. Discussion of the Related Art

Liquid crystal display (LCD) devices have been identified as a next-generation display device of great value because of their low power consumption and ease in portability.

Optical anisotropy and the polarization characteristics of a liquid crystal material form the basis for driving an LCD device. Generally, an LCD device includes two substrates, which are spaced apart and facing each other, and a liquid crystal layer interposed between the two substrates. Polarizers are disposed over outer surfaces of the two substrates, respectively. Each of the two substrates includes an electrode, and the electrodes of each substrate also face each other. Voltage applied to each electrode induces an electric field between the electrodes. Alignment of the liquid crystal molecules is changed by varying the intensity or direction of the electric field. The LCD device displays a picture by varying transmittance of the light according to the arrangement (or rearrangement) of the liquid crystal molecules.

One type of liquid crystal display (LCD), active matrix LCDs (AM-LCDs), which have thin film transistors (TFTs) and pixel electrodes arranged in a matrix form, and have been the subject of significant research and development because of their high resolution and superiority in displaying moving images.

The related art liquid crystal display panel has an upper substrate, a lower substrate and a liquid crystal layer interposed therebetween. The upper substrate, commonly referred to as a color filter substrate, usually includes a common electrode and color filters. The lower substrate, commonly referred to as an array substrate, includes switching elements, such as thin film transistors and pixel electrodes.

LCD device operation is based on the principle that the alignment direction of the liquid crystal molecules is dependent upon an electric field applied between the common electrode and the pixel electrode. Thus, the alignment direction of the liquid crystal molecules is controlled by the application of an electric field to the liquid crystal layer. When the alignment direction of the liquid crystal molecules is properly adjusted, incident light is refracted along the alignment direction to display image data. The liquid crystal molecules function as an optical modulation element having variable optical characteristics that depend upon polarity of the applied voltage.

In a related art LCD device, because the pixel and common electrodes are positioned on the lower and upper substrates, respectively, the electric field induced between them is perpendicular to the lower and upper substrates. However, the related art LCD devices having the longitudinal electric field have a drawback in that they have a very narrow viewing angle. In order to solve this problem of a narrow viewing angle, in-plane switching liquid crystal display (IPS-LCD) devices have been developed. IPS-LCD devices typically include a lower substrate in which a pixel electrode and a common electrode are disposed, an upper substrate having no electrode, and a liquid crystal interposed between the upper and lower substrates. A detailed explanation of the operation modes of a related art IPS-LCD device will be provided with reference to FIG. 1.

FIG. 1 is a schematic cross-sectional view illustrating a concept of a related art IPS-LCD device. As shown in FIG. 1, upper and lower substrates 10 and 20 are spaced apart from each other, and a liquid crystal layer 30 is interposed therebetween. The upper and lower substrates 10 and 20 are often referred to as a color filter substrate and an array substrate, respectively. On the lower substrate 20 are a common electrode 22 and a pixel electrode 24. The common and pixel electrodes 22 and 24 are aligned substantially parallel to each other. On a surface of the upper substrate 10, a color filter layer (not shown) is commonly positioned between the pixel electrode 24 and the common electrode 22 of the lower substrate 20. A voltage applied across the common and pixel electrodes 22 and 24 produces an electric field 26 through liquid crystal molecules of the liquid crystal layer 30. The liquid crystal layer 30 has a positive dielectric anisotropy, and thus the liquid crystal molecules align substantially parallel to the electric field 26.

The operation of a related art IPS-LCD device follows. When no electric field is applied to the common and pixel electrodes 22 and 24, i.e., off-state, the longitudinal axes of the liquid crystal (LC) molecules are parallel and form a definite angle with the common and pixel electrodes 22 and 24. For example, the longitudinal axes of the LC molecules are arranged parallel with both the common and pixel electrodes 22 and 24.

On the contrary, when a voltage is applied to the common and pixel electrodes 22 and 24, i.e., on state, an in-plane electric field 26 that is parallel to the surface of the lower substrate 20 is produced because the common and pixel electrodes 22 and 24 are on the lower substrate 20. Accordingly, the LC molecules are re-arranged such that their longitudinal axes coincide with the electric field 26.

The result is a wide viewing angle that ranges from about 80 to 85 degrees in up-and-down and left-and-right directions from a line vertical to the IPS-LCD device, for example.

FIG. 2 is a schematic plan view illustrating an array substrate for an IPS-LCD device according to the related art. As shown in FIG. 2, a gate line 40 and a data line 42 cross each other to define a pixel region P. A thin film transistor (TFT) T is formed at the crossing of the gate and data lines 40 and 42.

A common line 44 is formed substantially parallel to the gate line 40 and is spaced apart from the gate line 40. In the pixel region P, a plurality of common electrodes 46 extend in a substantially perpendicular from the common line 44, and are substantially parallel to the data line 42. The common electrodes 46 include two first common electrodes 46a and a second common electrode 46b. The two first common electrodes 46a are adjacent data lines 42, respectively. The second common electrode 46b is disposed between the two first common electrodes 46a, and thus is located in a middle portion of the pixel region P.

A first pixel connecting line 48 is connected to the thin film transistor T. A plurality of pixel electrodes 50 extend perpendicularly from the first pixel connecting line 48, and are arrayed in an alternating pattern with the plurality of common electrodes 46. A second pixel connecting line 52 is connected to ends of the pixel electrodes 50 opposite to the first pixel connecting line 48. The second pixel connecting line 52 overlaps the common line 44. The overlapped common line 44 and the second pixel connecting line 52 form a storage capacitor $C_{ST}$ with an insulator (not shown) interposed therebetween.

Each of spaces between the respective common electrodes 46 and the respective pixel electrodes 50 substantially corresponds to an aperture area A, where liquid crystal molecules are driven according to a lateral electric field that is parallel to a substrate. Each aperture area A may be referred to as a block. In FIG. 2, one pixel has 4 blocks, that is, 4 aperture areas A. Thus, in each pixel region P, three common electrodes 46 and two pixel electrodes 50 are arranged in an alternating pattern with each other.

FIGS. 3A and 3B are enlarged views of a region B of FIG. 2. FIGS. 3A and 3B show mainly correlation of a rubbing direction of an alignment layer and a direction of an electric field induced between common and pixel electrodes.

In FIGS. 3A and 3B, an alignment layer (not shown) is rubbed along a direction from a lower-right side to an upper-left side in the context of the figures. Liquid crystal molecules are initially arranged according to a rubbing direction of the alignment layer, which may have an angle of about 45 degrees with respect to a gate line (not shown). When voltages are applied to the common electrode and the pixel electrode, a lateral electric field is induced between the common electrode and the pixel electrode and is substantially parallel to a substrate. Therefore, the lateral electric field has a direction 56 perpendicular to the common and pixel electrodes.

In FIG. 3A, voltages of about 5V and about 8V are applied to the common electrode and the pixel electrode, respectively, and a voltage of about 8V is applied to a data line. There exists a voltage difference of about 3V between the common electrode and the pixel electrode. Liquid crystal molecules (not shown) are rearranged along the lateral electric field 56 induced due to the voltage difference to have a first direction 54. At this time, the voltages correspond to a gray image.

In FIG. 3B, voltages of about 5V and about 8V are applied to the common electrode and the pixel electrode, respectively, and a voltage of about 10V is applied to a data line. Thus, although there is a voltage difference of about 3V between the common electrode and the pixel electrode, the same as the voltage difference of FIG. 3A, an electric field between the common electrode and the pixel electrode may be substantially changed due to variation of the voltage applied to the data line. Accordingly, the liquid crystal molecules are arranged along a second direction 58, which is rotated more than the first direction 54 of FIG. 3A but is not parallel to the lateral electric field 56. Even though the same voltages are applied to the common electrode and the pixel electrode, light transmittance may be changed due to different data signals.

To solve the above problem, widths of outer common electrodes may be widened. That is, in FIG. 2, to reduce cross-talk between the data line 42 and the adjacent pixel electrode 50 and prevent light leakage, the first common electrodes 46a of FIG. 2 may have wider widths than that of the second common electrode 46b of FIG. 2. However, this causes a decreasing aperture ratio.

SUMMARY OF THE INVENTION

Accordingly, the present invention is directed to an in-plane switching liquid crystal display device that substantially obviates one or more of the problems due to limitations and disadvantages of the related art.

An advantage of the present invention is to provide an in-plane switching liquid crystal display device that increases a viewing angle.

Another advantage of the present invention is to provide an in-plane switching liquid crystal display device that improves brightness without reducing an aperture ratio.

Additional features and advantages of the invention will be set forth in the description which follows and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, an in-plane switching liquid crystal display device includes a gate line along a first direction, a data line along a second direction, the data line crossing the gate line to define a pixel region, a thin film transistor at a crossing of the gate and data lines, pixel electrodes along a third direction and in the pixel region, the pixel electrodes connected to the thin film transistor, common electrodes along the third direction, the common electrodes being in an alternating pattern with the pixel electrodes, and an alignment layer covering the common electrodes and the pixel electrodes, the alignment layer having an alignment direction along the first direction.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of that invention.

In the drawings.

DETAILED DESCRIPTION OF THE ILLUSTRATED EMBODIMENTS

Reference will now be made in detail to illustrated embodiments of the present invention, examples of which are shown in the accompanying drawings.

Figure 1:
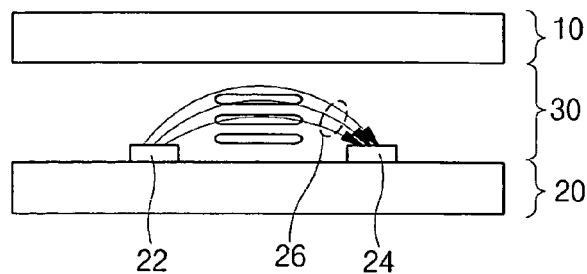
FIG. 1 is a schematic cross-sectional view illustrating a related art in-plane switching liquid crystal display (IPS-LCD) device.
Figure 2:
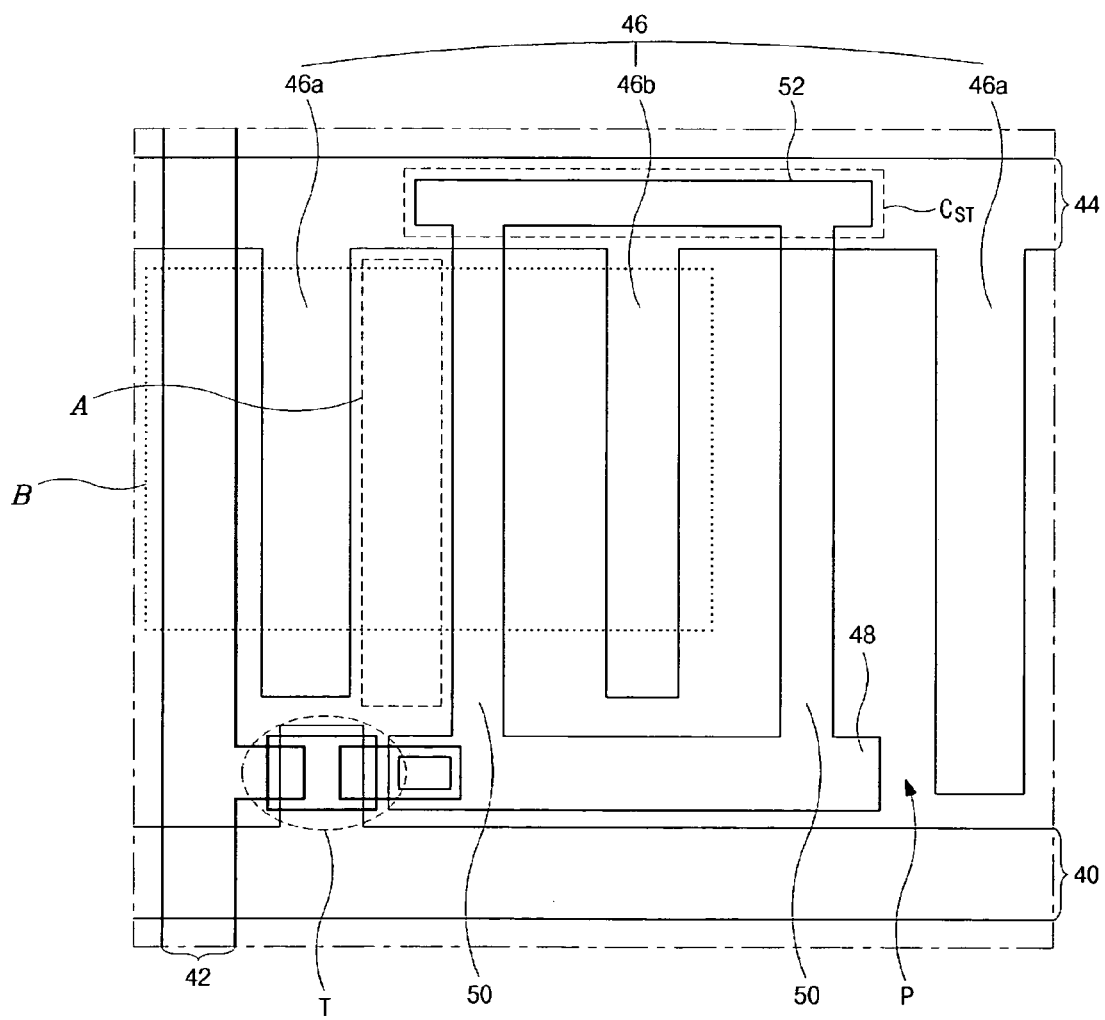
FIG. 2 is a schematic plan view illustrating an array substrate for an IPS-LCD device according to the related art.
Figure 3A:
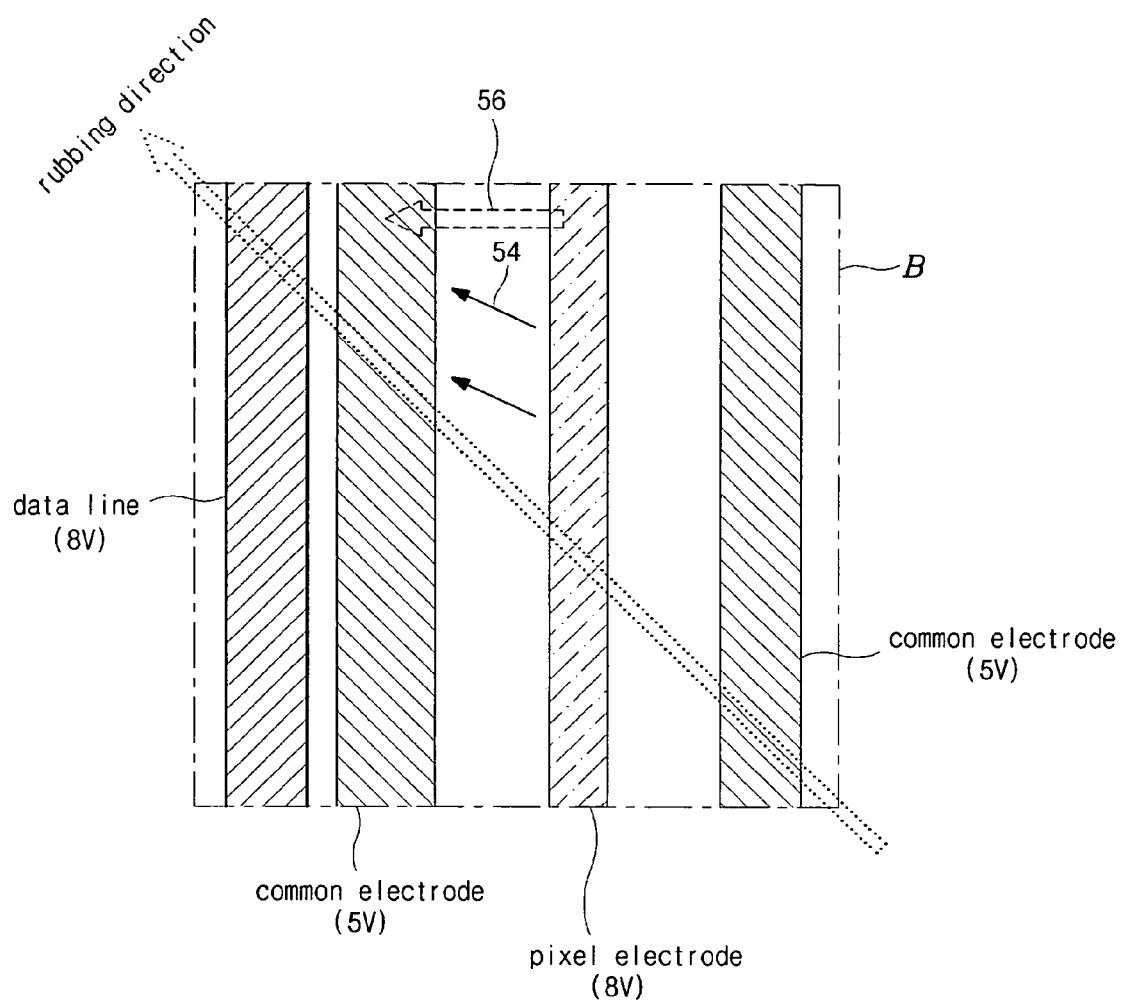
FIGS. 3A and 3B are enlarged views of a region B of FIG. 2.
Figure 3B:
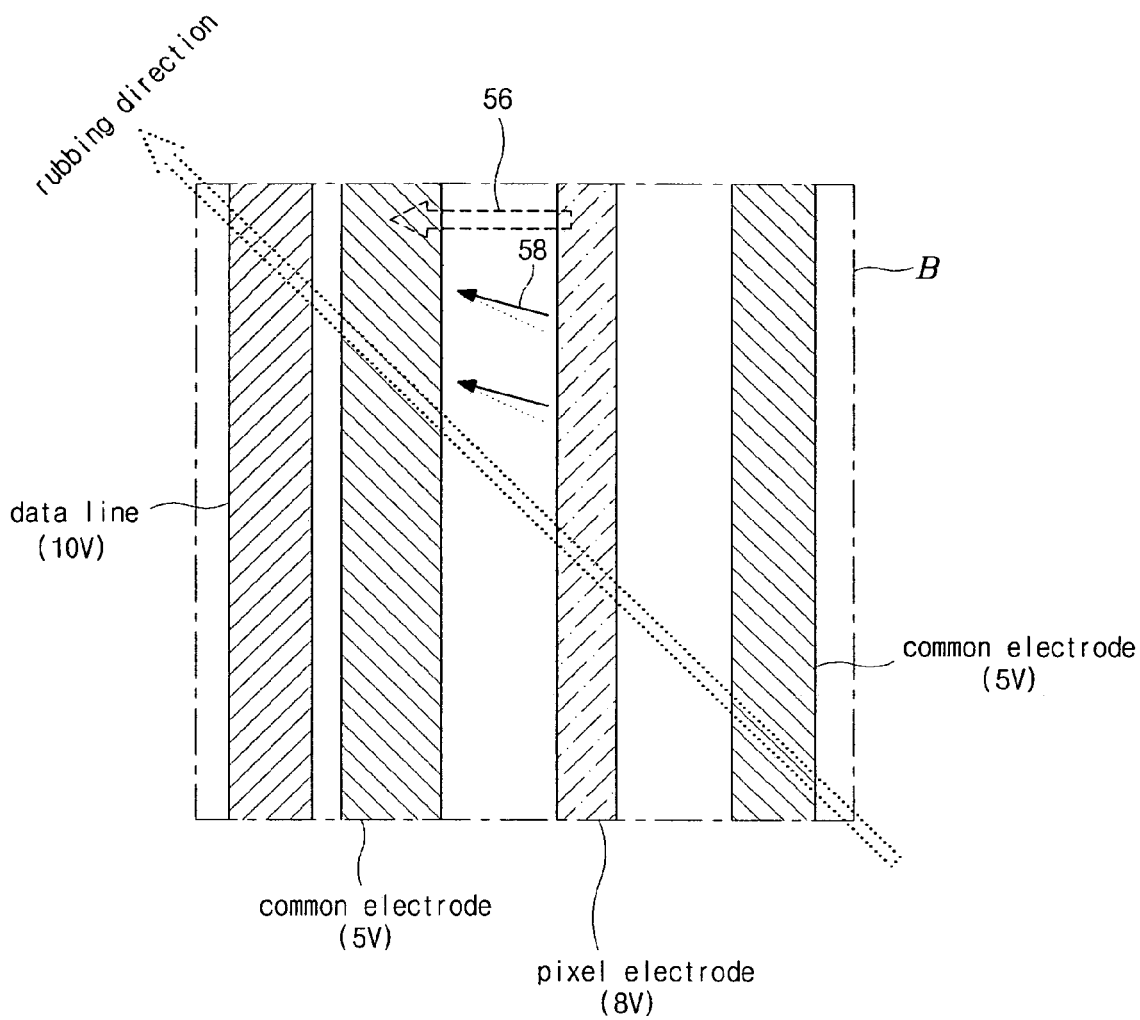
Figure 4:
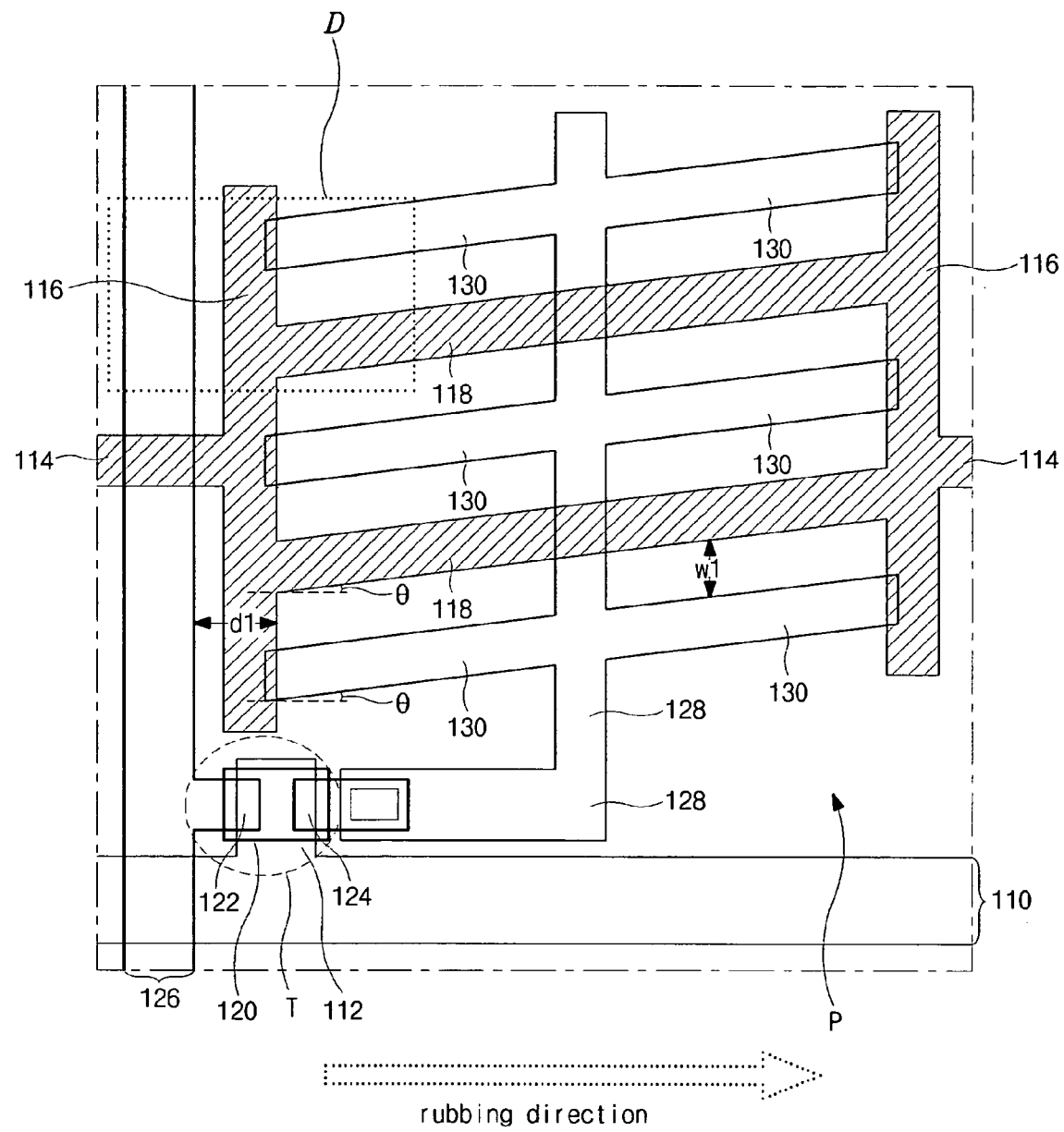
FIG. 4 is a plan view of an array substrate for an IPS-LCD device according to a first embodiment of the present invention.

FIG. 4 is a plan view of an array substrate for an in-plane switching liquid crystal display device according to a first embodiment of the present invention.

In FIG. 4, a gate line 110 is formed in a first direction and a data line 126 is formed in a second direction. The gate line 110 and the data line 126 cross each other to define a pixel region P. A thin film transistor T is formed at a crossing portion of the gate and data lines 110 and 126. A plurality of pixel electrodes 130 are formed in the pixel region P and are connected to the thin film transistor T. A plurality of common electrodes 118 are formed in the pixel region P in an alternating pattern with the plurality of pixel electrodes 130.

In the first embodiment, the pixel electrodes 130 and the common electrodes 118 are inclined to have a predetermined angle θ with respect to the first direction. The predetermined angle θ may be within a range of about 1 degree to about 45 degrees.

The thin film transistor T includes a gate electrode 112, a semiconductor layer 120, a source electrode 122, and a drain electrode 124. A pixel connecting line 128 is connected to the drain electrode 124. The pixel connecting line 128 has a reverse L shape. The plurality of pixel electrodes 130 extend from both sides of the pixel connecting line 128 substantially along the first direction. The pixel electrodes 130 are substantially parallel to each other.

Common connecting lines 116 are formed in the pixel region P along the second direction. The common connecting lines 116 are near respective data lines 126. That is, two common connecting lines 116 are formed in one pixel region P. The plurality of common electrodes 118 are formed between the common connecting lines 116, alternating with the pixel electrodes 130. The common connecting lines 116 in adjacent pixel regions P are electrically connected to each other through a common line 114 formed in the first direction.

Although not shown in detail in the figure, an alignment layer is formed on substantially an entire surface of the substrate to cover the pixel electrodes 130. The alignment layer is rubbed along a direction of an electric field induced between the data line 126 and the common connecting line 116 adjacent thereto. The direction of the electric field between the data line 126 and the common connecting line 116 adjacent thereto is substantially parallel to the first direction. Thus, the alignment layer is rubbed along the first direction.

In the first embodiment, because the rubbing direction, which determines an initial arrangement of liquid crystal molecules (not shown), and the direction of the electric field between the data line 126 and the common connecting line 116 adjacent thereto, which determines arrangement of the liquid crystal molecules when a voltage is applied, are the same, light leakage can be effectively prevented in a region between the data line 126 and the common connecting line 116 adjacent thereto. Accordingly, an aperture ratio may be increased due to a decreasing area of a pattern for blocking the light leakage.

To form a white brightness using a lateral electric field having an angle of about 90 degrees with respect to the rubbing direction, the common electrodes 118 and the pixel electrodes 130 are inclined at a predetermined angle with respect to the rubbing direction, that is, the first direction. The predetermined angle may be determined within a range of about 1 degree to about 45 degrees so that the liquid crystal molecules can be easily rotated toward a desired direction.

A width W1 between the common electrode 118 and the pixel electrode 130 is more than or equal to a distance d1 between a first side of the data line 126 and an inner side of the common connecting line 116, which is far from the first side of the data line 126, to form the lateral electric field. The width W1 may be, for example, 10 micrometers. The distance d1 may be, for example, in a range of about 3-8 micrometers.

In the first embodiment, because the liquid crystal molecules between the data line and the common connecting line are not rotated when the voltage is applied, light leakage can be prevented. Thus, a width of the common connecting line may be reduced, and the aperture ratio may be increased.

Figure 5A:
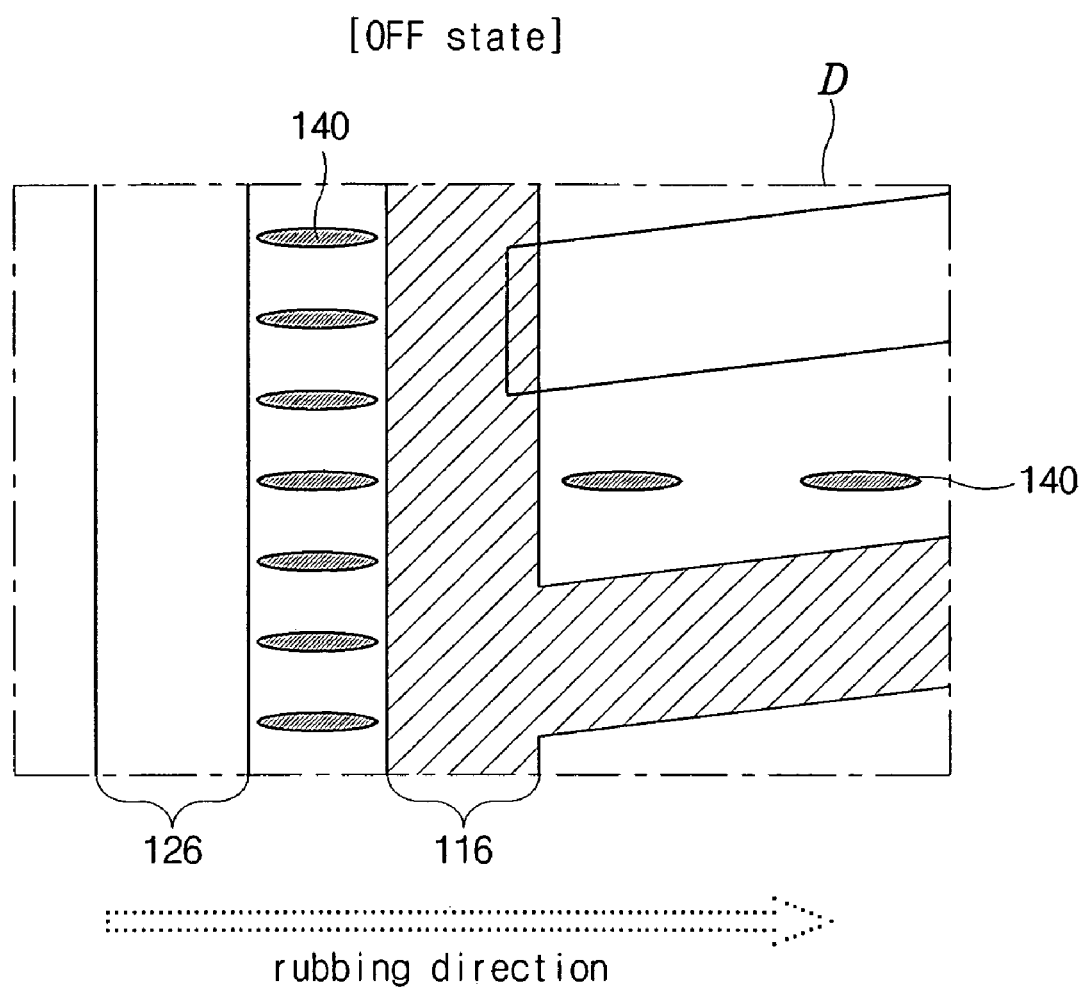
FIGS. 5A and 5B are enlarged views of an area D of FIG. 4 illustrating an arrangement of liquid crystal molecules in OFF state and ON state, respectively.
Figure 5B:
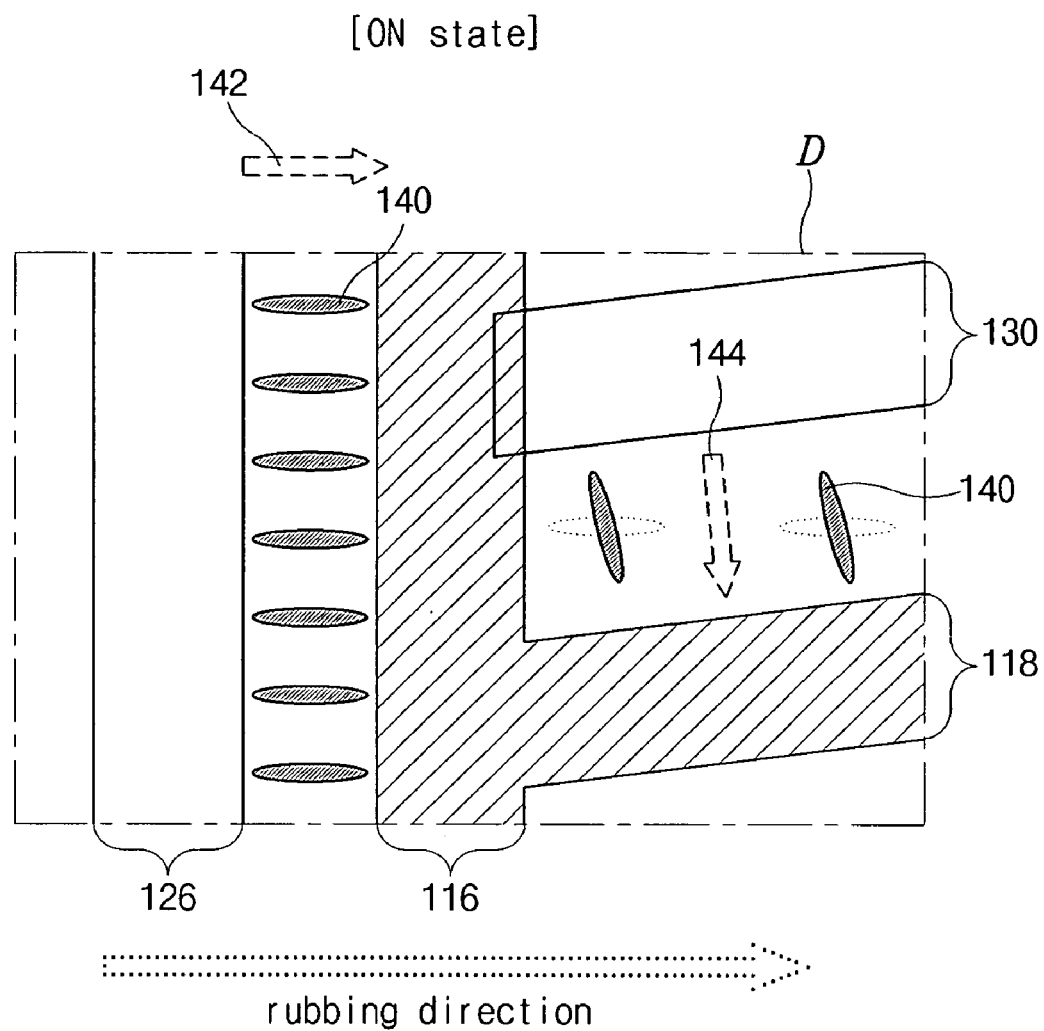

FIGS. 5A and 5B are enlarged views of an area D of FIG. 4, and illustrate an arrangement of liquid crystal molecules in an OFF state and ON state, respectively.

In the OFF state of FIG. 5A, that is, when a voltage is not applied, liquid crystal molecules 140 are arranged along a rubbing direction. Because there is no electric field in the OFF state, the rubbing direction determines an initial arrangement of the liquid crystal molecules 140. In this embodiment, the rubbing direction is substantially parallel to the gate line 110 of FIG. 4. Thus, the liquid crystal molecules 140 between the data line 126 and the common connecting line 116 cross the data line 126 in a substantially perpendicular direction.

In the ON state of FIG. 5B, that is, when a voltage is applied, the liquid crystal molecules 140 are arranged along a direction of an electric field. A lateral electric field 144 is induced between the common electrode 118 and the pixel electrode 130. The common electrode 118 and the pixel electrode 130 are inclined to have a predetermined angle with respect to the gate line 110. Thus, the liquid crystal molecules 140 can be easily rotated. Meanwhile, an electric field 142 is induced between the data line 126 and the common connecting line 116 that is substantially perpendicular to the data line 126. That is, the electric field 142 is substantially parallel to the rubbing direction. Thus, the liquid crystal molecules 140 between the data line 126 and the common connecting line 116 are not rotated.

Figure 6:
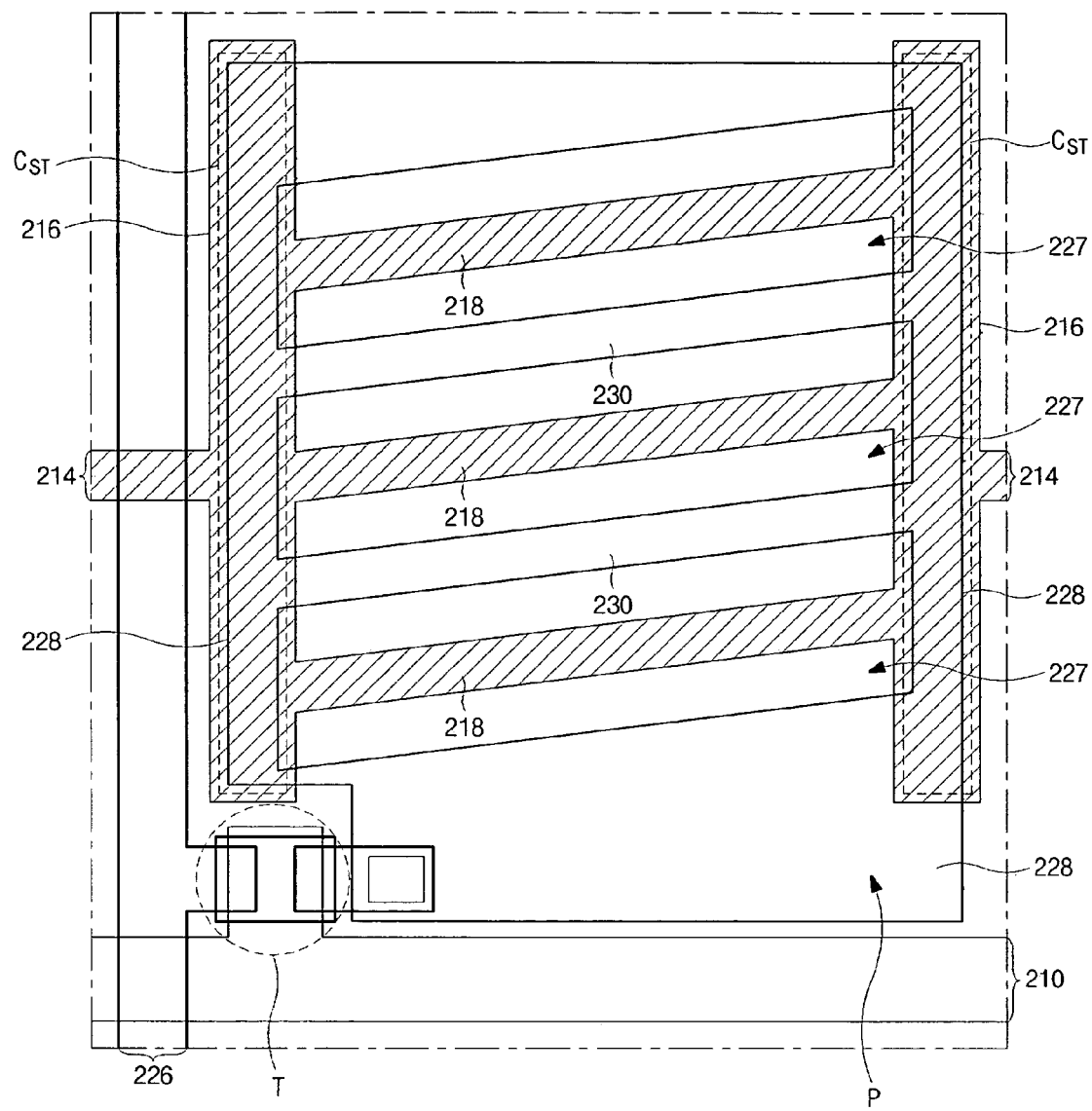
FIG. 6 is a plan view of an array substrate for an IPS-LCD device according to a second embodiment of the present invention.

FIG. 6 is a plan view of an array substrate for an in-plane switching liquid crystal display device according to a second embodiment of the present invention.

In FIG. 6, a gate line 210 is formed in a first direction and a data line 226 is formed in a second direction. The gate line 210 and the data line 226 cross each other to define a pixel region P. A thin film transistor T is formed at a crossing portion of the gate and data lines 210 and 226.

A plurality of pixel electrodes 230 are formed in the pixel region P and are connected to the thin film transistor T. A plurality of common electrodes 218 are formed in the pixel region P in an alternating pattern with the plurality of pixel electrodes 230.

A pixel connecting line 228 is formed along the perimeter of the pixel region P. The pixel connecting line 228 is connected to the thin film transistor T and is spaced apart from the gate line 210 and the data line 226. Pixel electrodes 230 are formed in the pixel connecting line 228 along a third direction, which is inclined with respect to the first direction, and are connected to the pixel connecting line 228. The pixel electrodes 230 and the pixel connecting line 228 form openings 227.

Common connecting lines 216 are formed in the pixel region P along the second direction. The common connecting lines 216 overlap the pixel connecting line 228. The common connecting lines 216 are near respective data lines 226. That is, two common connecting lines 216 are formed in one pixel region P. Common electrodes 218 are formed between the common connecting lines 216. The common electrodes 218 are disposed in the openings 227, and alternate with the pixel electrodes 230. The common connecting lines 216 in adjacent pixel regions P are electrically connected to each other through a common line 214 formed in the first direction.

The pixel connecting line 228 and the common connecting lines 216 form a storage capacitor $C_{ST}$ having an insulating layer (not shown) interposed therebetween. In the related art, an aperture area is decreased to form a storage capacitor. However, in the present embodiment, the pixel connecting line 228 and the common connecting lines 216 adjacent to the data line 226 form the storage capacitor $C_{ST}$. Thus, capacitance of the storage capacitor $C_{ST}$ can be increased while the aperture ratio is not reduced.

Figure 7:
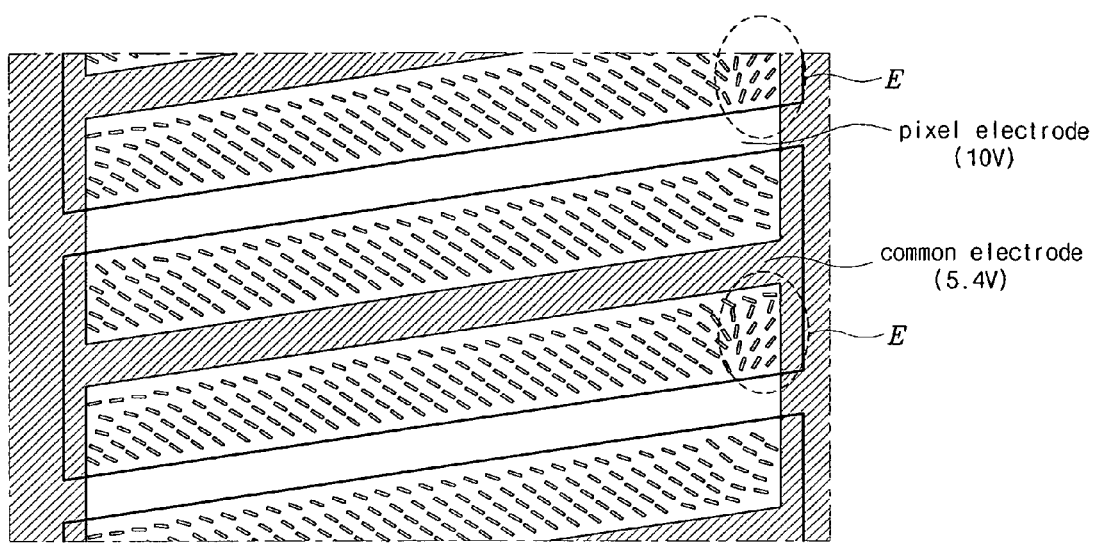
FIG. 7 is a view showing a direction of an electric field in the array substrate according to the second embodiment of the present invention when a voltage is applied.

FIG. 7 shows a direction of an electric field in the array substrate according to the second embodiment of the present invention when a voltage is applied.

In FIG. 7, a voltage of about 10V is applied to the pixel electrodes and a voltage of about 5.4V is applied to the common electrodes. An electric field is induced between the pixel and common electrodes, and thus liquid crystal molecules (not shown) are arranged along a direction of the electric field.

The electric field in an edge of the opening, especially in a right edge E in the context of the figure, has a different direction from a middle portion of the opening. Accordingly, there exists distortion of the electric field, and quality of an image is lowered due to this.

Figure 8:
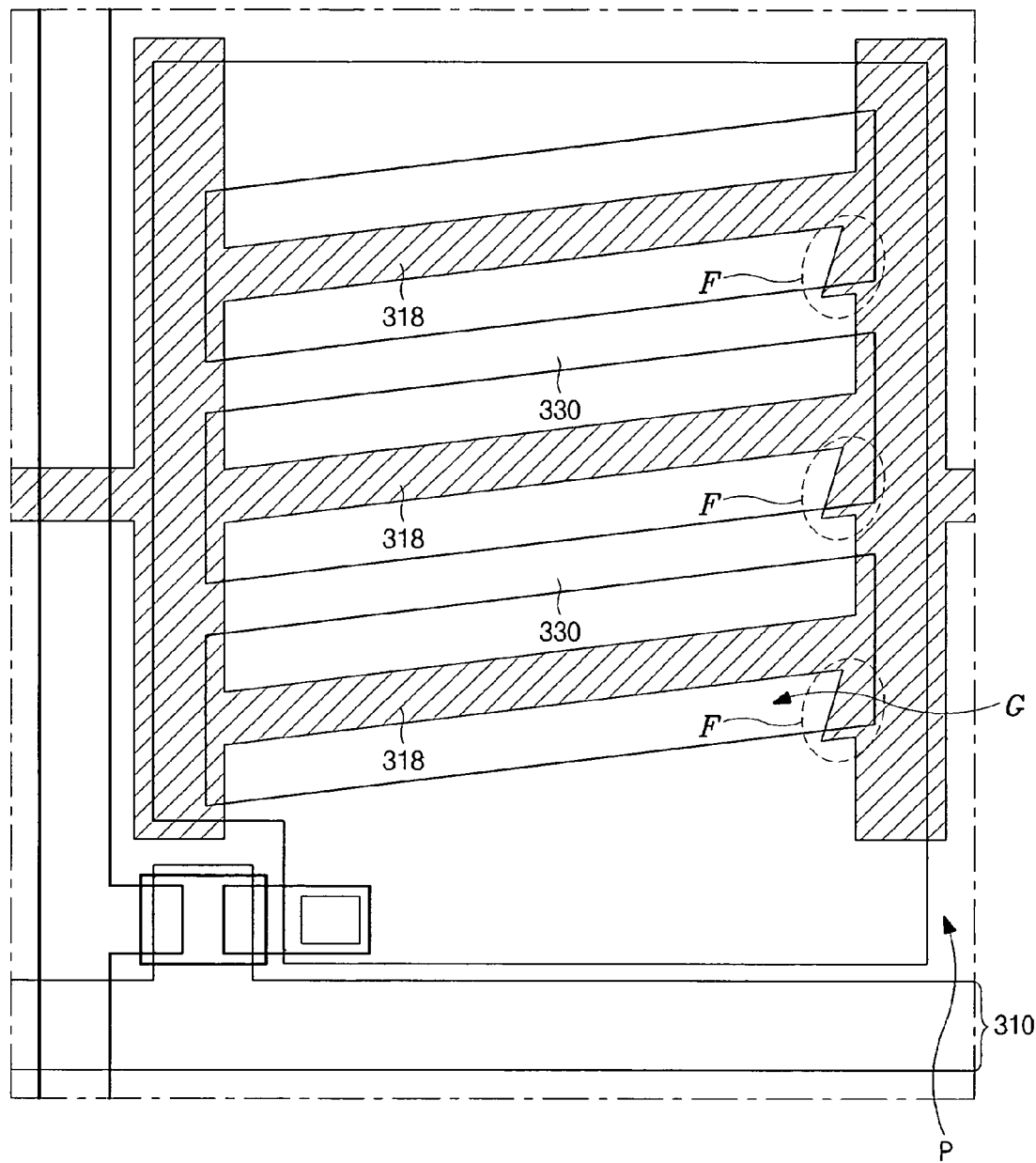
FIG. 8 is a plan view of an array substrate for an IPS-LCD device according to a third embodiment of the present invention.

FIG. 8 is a plan view of an array substrate for an in-plane switching liquid crystal display device according to a third embodiment of the present invention. Here, explanation for the same parts as FIG. 6 may be omitted.

In FIG. 8, one end of each common electrode 318 has a protrusion F that overlaps a pixel electrode 330 adjacent to the common electrode 318. The one end of each common electrode 318 is further from a gate line 310 than the other end of each common electrode 318. The protrusion F is formed at a side of each common electrode 318 facing the gate line 310, which defines a corresponding pixel region P.

Liquid crystal molecules (not shown) are uniformly arranged in each open portion G by forming the protrusion F.

In the present invention, the common electrodes, the pixel electrodes and the rubbing direction have the same direction as the gate line. Thus, the liquid crystal molecules adjacent to the data line are not rotated even if a voltage is applied. Light leakage around the data line can be prevented. Additionally, because the common electrodes and the pixel electrodes have a different direction from the data line, the data line has a minimum effect on an electric field between the common and pixel electrodes and thus the image is improved.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A substrate for an in-plane switching liquid crystal display device, comprising:
    a gate line along a first direction;
    a data line along a second direction, the data line crossing the gate line to define a pixel region;
    a thin film transistor at a crossing of the gate and data lines;
    at least two pixel connecting lines along the second direction and in the pixel region, one of the at least two pixel connecting lines connected to the thin film transistor;
    pixel electrodes along a third direction within the pixel region;
    common electrodes along the third direction, the common electrodes being in an alternating pattern with the pixel electrodes;
    an alignment layer covering the common electrodes and the pixel electrodes, the alignment layer having an alignment direction along the first direction; and
    at least two common connecting lines in the second direction of each pixel region, wherein the common connecting lines are near the data line and wherein one of the at least two common connecting lines combines one end of each of the common electrodes and another one of the at least two common connecting lines combines the other end of the common electrodes, and wherein one of the at least two pixel connecting lines combines one end of each of the pixel electrodes and another one of the at least two pixel connecting lines combines the other end of the pixel electrodes.

2. The substrate of claim 1, wherein the third direction is inclined to have a predetermined angle with respect to the first direction.

3. The substrate of claim 2, wherein the predetermined angle is within a range of about 1 degree to about 45 degrees.

4. The substrate of claim 1, further comprising a common line in the first direction, wherein the common line is connected to the common connecting line at adjacent pixel regions.

5. The substrate of claim 1, wherein a width between pixel and common electrodes is more than or equal to a distance between a first side of the data line and an inner side of the common connecting line.

6. The substrate of claim 5, wherein the width between the pixel and common electrodes is about 10 micrometers.

7. The substrate of claim 5, wherein the distance between the first side of the data line and the inner side of the common connecting line is in a range of about 3-8 micrometers.

8. The substrate of claim 1, wherein the pixel connecting line is formed along a perimeter of the pixel region.

9. The substrate of claim 8, wherein the pixel connecting line and the pixel electrodes form openings.

10. The substrate of claim 9, wherein the common electrodes are disposed in the openings.

11. The substrate of claim 8, further comprising a common connecting line in the second direction, wherein the common connecting line is connected to the common electrodes and overlaps a portion of the pixel connecting line.

12. The substrate of claim 11, wherein the common connecting line and the overlapped portion of the pixel connecting line form a storage capacitor having an insulating layer interposed therebetween.

13. The substrate of claim 11, further comprising a common line connecting the common connecting lines at adjacent pixel regions.

14. The substrate of claim 8, wherein each common electrode has a protrusion at a first end.

15. The substrate of claim 14, wherein the protrusion at the first end is further from the gate line than a second end of the common electrode.

16. The substrate of claim 14, wherein the protrusion overlaps an adjacent pixel electrode.

17. The substrate of claim 14, wherein the protrusion is formed at a side of the common electrode closer to the gate line.

18. The substrate of claim 1, wherein the pixel electrodes are formed of indium tin oxide (ITO).

19. The substrate of claim 1, wherein the common electrodes are formed of a same material as the gate line.

* * * * *